Patented Feb. 14, 1928.

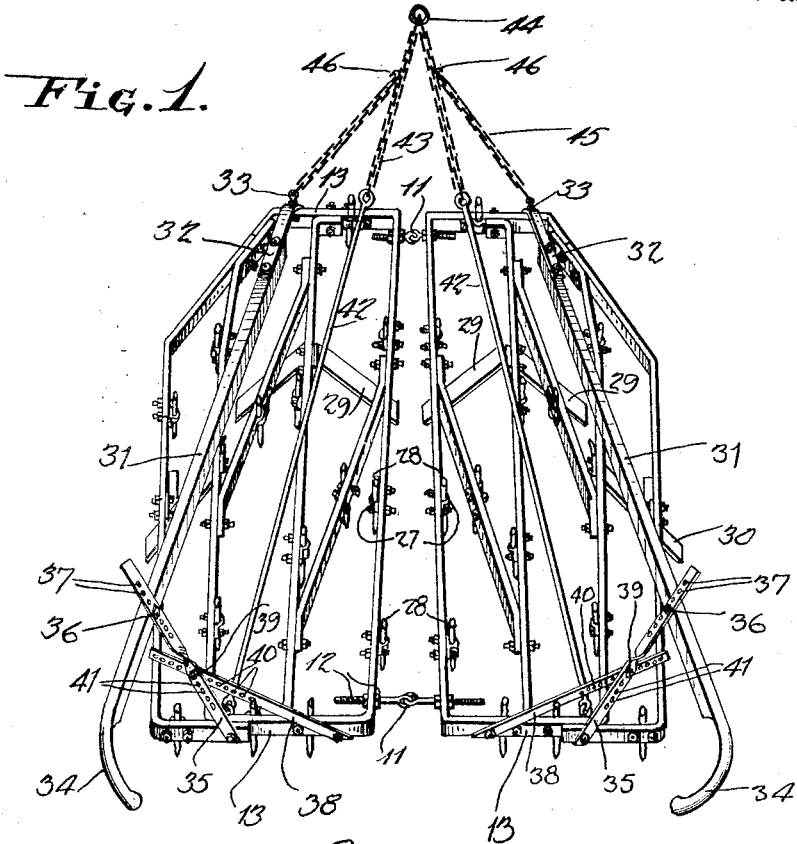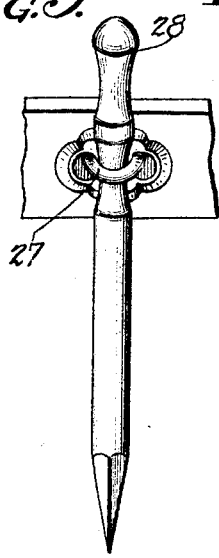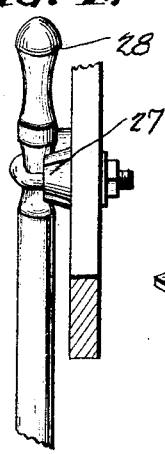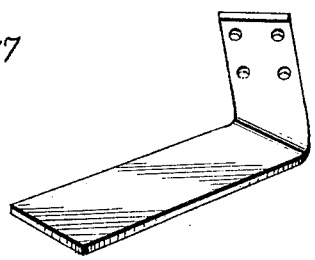

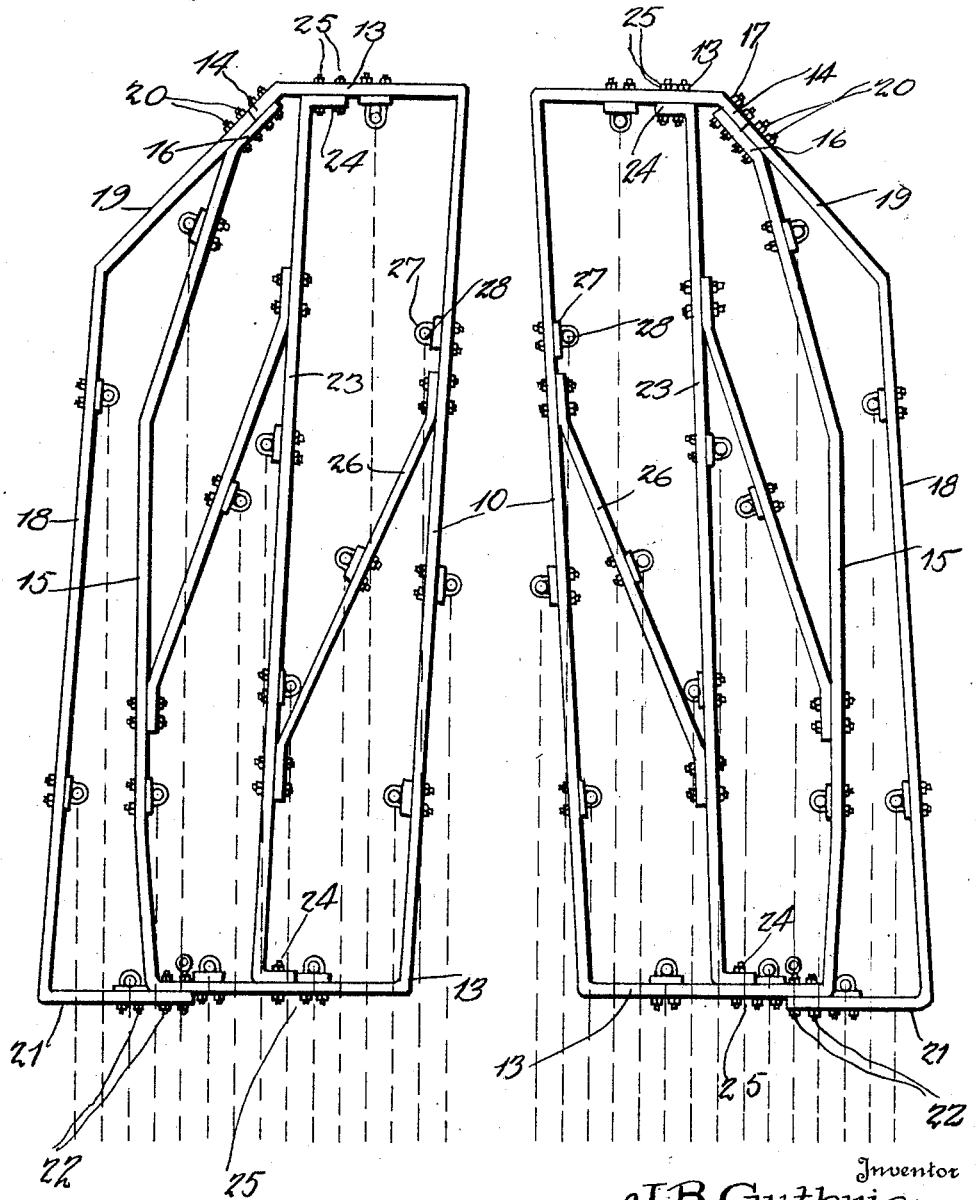

1,659,262

UNITED STATES PATENT OFFICE.

JAMES B. GUTHRIE, OF MEMPHIS, TENNESSEE.

HARROW.

Application filed December 8, 1926. Serial No. 153,430.

This invention relates to agricultural machinery and has special reference to a harrow.

More particularly the invention relates to improvements in my prior Patent Number 1,605,183, issued November 2, 1926.

One important object of the invention is to provide an improved form of hitch for harrows of this description.

A second important object of the invention is to provide an improved means for supporting the movable handles in a harrow of this character.

A third important object of the invention is to provide an improved arrangement of bars, tooth supports and teeth so constructed that the teeth will act upon the ground, on each side of the harrow, at evenly spaced intervals in a lateral direction.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is a perspective view of a harrow constructed in accordance with these improvements.

Figure 2 is a plan view of the frames of such a harrow in their position when flattened out and showing the spacing of the bars and arrangements of the teeth.

Figure 3 is a perspective view of a tooth and its holder from the front of the face bar which carries the same.

Figure 4 is a similar perspective view at right angles to Figure 3.

Figure 5 is a perspective view of one form of scraper blade used herewith.

Figure 6 is a perspective view of a guard used herewith to keep the harrow teeth from going too deep next to the plants.

In the present embodiment of the invention the main part of each frame consists of a bar of metal rectangular in cross section and bent to form an inner longitudinal frame member 10, the members 10 of the two frames forming the complete harrow being closer together at the front than at the rear and held in adjusted position by means of interengaging eye bolts 11 having nuts 12 on each side of the frame so that by adjusting these nuts the two frames may be moved toward or from each other, then held there. Moreover, the interlocking eye bolts permit tilting of the frames with respect to each other so that the harrow may be used on flat ground, on ridges formed by throwing up the dirt and in the furrows between such ridges. At each end of the respective members 10 the bar is bent to extend laterally as at 13 and at the forward end the bar is bent at about forty-five degrees to the rear as at 14, this forming a termination of this end of the bar. From the outer end of the rear portion 13 the bar is carried forwardly with suitable bends and inclinations as shown at 15 and terminates in an angular portion 16 lying on the outside of the part 14 and secured thereto by bolts or rivets 17. This forms the main part of each frame member. On the outside of the part 15 there is provided an outer frame member 18 having an inclined forward end 19 which lies against the part 16 and is secured thereto by bolts or rivets 20. At the rear end of this portion 18 the bar, which is of the same cross section as the bar 10, is bent inwardly as at 21 and lies against the outer face of the outer end of the rear part 13, being secured thereto by bolts or rivets 22. Connecting the two parts 13 is an intermediate bar 23 having angularly disposed ends 24 secured to the parts 13 by bolts or rivets 25. To each side of the bars 23 is secured a respective end of a diagonal bar 26, the remaining end of one bar being secured to the part 10 and of the other bar being secured to the part 15. Clips 27, preferably of the type used to hold wire rope and the like, are utilized to secure harrow teeth 28 in position on the various longitudinal end diagonal bars and on the portions 13 and 21 and these clips and the teeth 28 are so disposed that the lateral spacing of the teeth is uniform throughout the extent of each of the two frames forming the complete harrow as will be clearly seen by reference to Figure 2 wherein the dotted lines typically indicate the paths of these teeth with the harrow moving forwardly over the ground in flat position. Obviously, this spacing is in no ways affected by the angular inclination of the frames so far as regards its evenness upon the ground being worked. Scraper blades 29 may be secured to the portions 23 and 15 and short scraper blades 30 may be secured to the portions 18, the securing means being preferably bolts and nuts so that these blades can be removed at will.

Each frame is provided with a handle or stilt 31 carrying at its forward end a metallic extension 32 pivoted to the respective forward frame portion 13 as by a pivot bolt 33. The rear of each of these stilts or handles is provided with a hand grip 34. On each frame at the rear thereof there is pivoted a bar 35 which extends up along the inner side of the respective handle 31 and is secured adjustably thereto by means of a bolt 36 passing through one of a series of openings 37 formed in the upper end of the bar 35. The brace bar 38 is also pivoted to the rear of each frame and this brace bar is connected to the respective bar 35 by a bolt 39 passing through a selected opening 14 in the brace bar 38 and through a selected opening 41 in the bar 35. By this means the positions of the hand grips 34 may be adjusted to suit the user of the harrow and to the inclination at which the two halves are intended to work.

In order to draw the harrow over the ground links 42 have their rear ends connected to the rear members 13 and the forward ends of these links carry chains 43 which are united to a single ring 44 to which the doubletree or other draft of plants may be connected. In order to adjust the inclination of the links 42 and chains 43 so that the ring 44 will be of proper height there are also provided short chains 45 each of which has one end connected to the respective bolt 38 and is provided at its other end with a hook 46 which may be hooked into any one of the links of the respective chain 43. Naturally, by engaging links close to the ring 44 the ring will be pulled down while by engaging links close to the members 42 the ring 44 will be allowed to rise.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Furthermore, it will be noted that the side members 18 are removable so that the harrow may be used between rows too narrow for full width harrows.

Having thus described the invention, what is claimed as new, is:

1. In a harrow, a pair of frames hinged together along the longitudinal center line of the harrow, means to adjust the front and rear portions of said frames independently toward and from each other, a pair of handles each pivoted to the forward portion of a respective frame, a pair of links each pivoted to the rear portion of a respective frame, means for connecting the handles adjustably to the links, brace links pivoted to the rear portions of said frames, and means to adjustably connect the brace links and the first mentioned links.

2. In combination, a pair of harrow frames, means for connecting said harrow frames hingedly and adjustably, each of said harrow frames including front and rear transverse members, links each having one end pivotally connected to the rear transverse member of a respective frame, chains having their rear ends connected to the front ends of said links, a ring to which the front ends of said chains are connected, other chains each having an end connected to the front transverse member of a respective frame, and hooks carried by the free ends of the last mentioned chains and engageable with selected links of the first mentioned chains.

In testimony whereof I affix my signature.

JAMES B. GUTHRIE.